Figure 1:
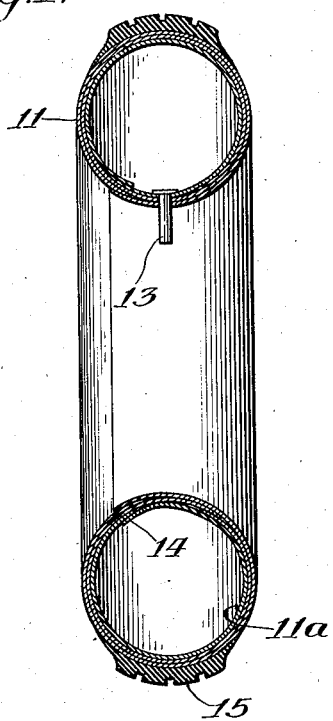

Sept. 24, 1935.  A. J. MUSSELMAN  2,015,459
TIRE AND METHOD OF MAKING THE SAME
Filed Sept. 5, 1933   2 Sheets-Sheet 1

Inventor:
Alvin J. Musselman.
By:
Dyrenforth, Lee, Chritton & Wiles
Attorneys

Sept. 24, 1935.    A. J. MUSSELMAN    2,015,459
TIRE AND METHOD OF MAKING THE SAME
Filed Sept. 5, 1933    2 Sheets-Sheet 2
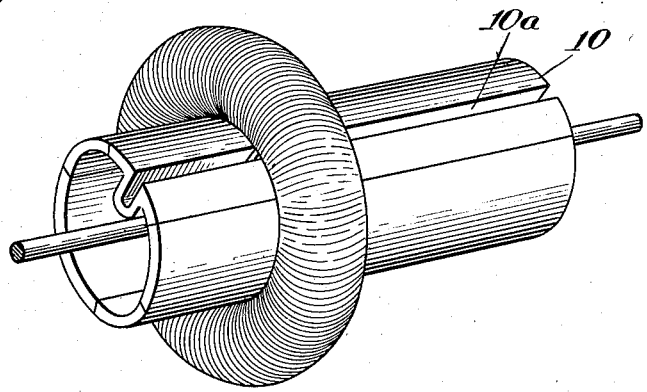
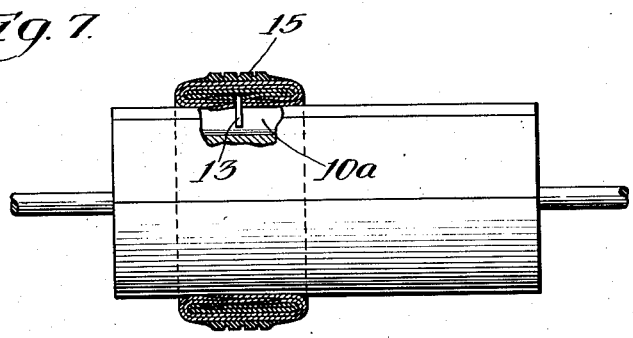
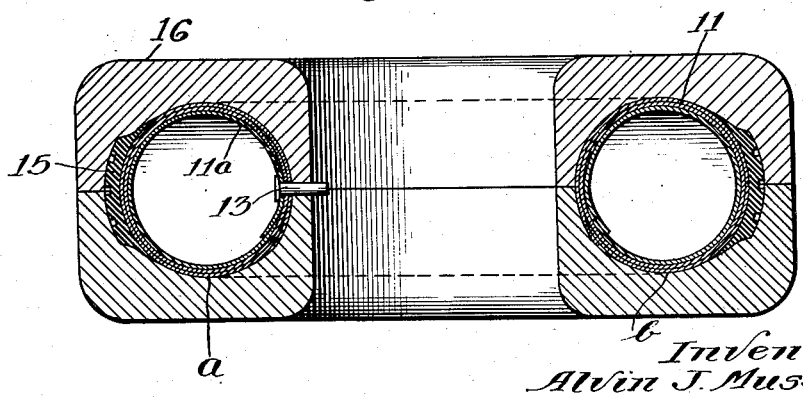
Inventor:
Alvin J. Musselman
By Dynenforth, Lee, Chritton & Wiles
Attorneys Patented Sept. 24, 1935

2,015,459

UNITED STATES PATENT OFFICE 2,015,459

TIRE AND METHOD OF MAKING THE SAME

Alvin J. Musselman, Cuyahoga Falls, Ohio

Application September 5, 1933, Serial No. 688,232

18 Claims. (Cl. 154—14)

This invention relates to improvements in tires and the method of making the same and, more particularly, to single tube pneumatic tires.

Heretofore in the making of such tires, it has been customary to form the same on a drum with a diameter substantially the same as the rim on which the tire is to be used. This method has been found satisfactory in the making of tires with a relatively small cross-section, such as bicycle tires ranging from, say, 1¼" to 1¾" designed for use on rims from 20" to 28". Tires of this size are ordinarily fastened to the rims with cement. In making tires of this kind, the fabric ordinarily has been built upon a drum with a diameter substantially the same as the rim on which the tire is to be used. For example, in making a 28" x 1½" tire (the former dimension representing the outside diameter of the tire), the fabric has been built up on a drum having a diameter of approximately 25". It will be seen that a tire having an outside diameter of 28" and a cross-sectional diameter of 1½" has an inside or rim diameter of 25".

It has been found, however, that the method above described is not satisfactory in making tires having a relatively larger cross-sectional diameter. Such tires are sometimes known as the doughnut type and may have a cross-sectional diameter of from 25 to 33% of the overall or outside diameter. For example, such a tire may have the dimensions 10" x 2¾" in which the former is the outside diameter, and the latter the diameter of a section of the tire. In making a tire of such dimensions, if a drum is employed having a diameter substantially the same as the rim on which the tire is to be fitted, so much distortion or stretching is required in the mold during the curing process that the completed tire proves defective.

Among the features of my invention is the provision of a new method for making the so-called doughnut tires, for example, tires 10"x 2¾"; 10"x 3", and the like. By the use of my method, single tube tires can be made of the sizes given and also of approximately all sizes in which the sectional diameter runs as high as ⅓ or more of the overall diameter of the tire.

In the practice of my invention, I prefer to form the tire of cord fabric and one of the features is the cutting of such fabric so that the cords will lie at an angle of substantially 60° with respect to the line of the cut. When the fabric is formed on a drum, as explained above, having a diameter materially larger than the rim diameter, the inside diameter will be considerably more than the inside diameter of the curing mold. Consequently, when the uncured tire is placed in the mold and expanded with internal steam or air pressure, the cords will contract at the inside and expand at the tread sufficiently to fill the mold. In so doing, the 60° angle of the cords in the fabric will be shifted to bring them substantially to the best angle for commercial use. This angle is such that when the tire is cured, a still further shift of the angle of the cords is permitted when the tire is inflated. This further change constricts the tire, causing it to grip the rim, making it commercially usable without other mechanical means such as cement for fastening it to the rim.

Other features and advantages of my invention will appear more fully as I proceed with my specification.

In the accompanying drawings I have illustrated my new method of making a tire and have shown the completed article. For the purpose of illustrating the invention more fully, I have shown the same particularly applied to the making of a 10" x 2¾" tire. It is to be understood, however, that the invention is equally applicable to other sizes of tires in which the cross-sectional diameter is relatively large with respect to the outside diameter of the tire, for example, in the nature of from 22 to 33% of the same.

Figure 2:
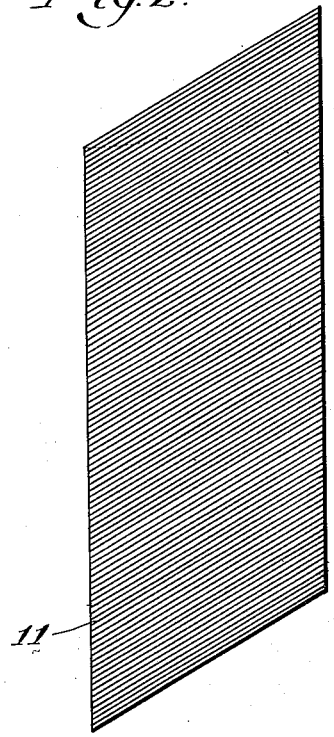
Figure 3:
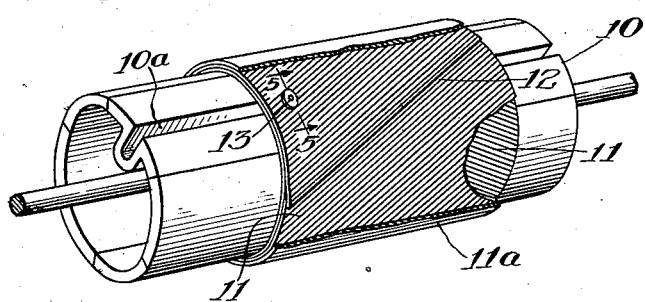
Figure 5:
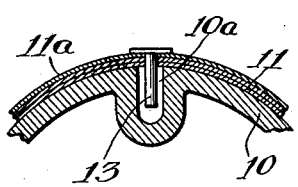
Figure 4:
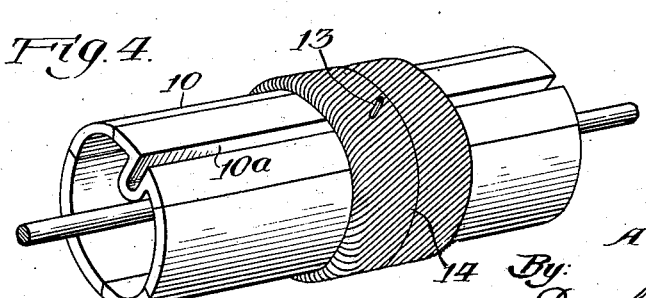

As shown in the drawings, Figure 1 is a vertical sectional view of a complete tire shown upon an enlarged scale as compared with Figs. 3 to 7 inclusive; Fig. 2 is a top plan view of a piece of fabric cut prior to placing the same on the drum for forming the tire; Fig. 3 shows the fabric on the drum; Fig. 4 shows the fabric on the drum with the edges overlapped to form the tube; Fig. 5 is a view taken as indicated at the line 5 of Fig. 3; Fig. 6 is a view similar to Fig. 4 showing the partial inflation to assist in turning the tube over on the drum; Fig. 7 shows the tube turned over and the tread applied; and Fig. 8 is a view, upon an enlarged scale as compared with Figs. 3 to 7 inclusive, of the tire being cured in the mold.

As shown in the drawings, 10 indicates a drum upon which the tire is formed. It is to be noted that this drum has a diameter of approximately 6" for the making of a tire 10" x 2¾". Such a tire is designed for a rim 4½" and it is to be particularly noted that the drum has a diameter of 6", which is materially greater. As here shown, the drum diameter exceeds the rim diameter by 33⅓%. Allowing for the thickness of the fabric in a double-ply tire, therefore, the distance between opposite centers of the deflated tube on the drum will be about 7¼" or a distance equal to the rim diameter plus the cross-sectional diameter, or possibly somewhat less.

In making the tire, I cut strips of cord fabric 11 long enough to go around the drum. This fabric is cut so that the cords lie at an angle of substantially 60° with respect to the line of the cut. As here shown, for making a tire with a cross-sectional diameter of 2¾" the strip is cut approximately 9" wide. This will give about ⅓" overlap to form the same.

The drum 10 is provided with the usual groove 10ª for the accommodation of the valve. The strips 11 are wound on the drum, as shown in Fig. 3, and the ends overlapped and cemented to form the seams 12. As here shown, the tire is made of two layers of cord fabric to make a so-called double ply tire. These two layers, as shown in Fig. 3, are wound in opposite directions so that the cords in the two pieces will be reversed. More layers of cord fabric may be employed if it is so desired to produce 4 or 6 ply tires. Over the outer layer 11, a layer 11ª of gum rubber is placed to form the air tube for the tire. The layer 11ª is approximately the same length and width as the layers 11. After the two strips 11 and the layer 11ª of gum rubber are on the drum, the valve 13 is inserted in the usual manner. The edges of the strips 11 are then turned upwardly and inwardly, overlapped and cemented to form the seam 14, as shown in Fig. 4. This completes the tube.

The tube is then partly inflated, as shown in Fig. 6, and rolled over on the drum, causing the valve 13 to again enter the slot 10ª. The tube is then deflated and flattened, as shown in Fig. 7, and the tread 15 applied in the usual manner. In some instances the tread 15 may be applied while the tire is inflated.

The uncured tire is then placed in the mold 16 which has a rim diameter of approximately 4½", or in other words, approximately the diameter of the completed tire. The tire is then inflated in the mold in any suitable manner, as for example, by steam or air and cured in a well-known way. It is to be noted particularly that the uncured tire is formed in a mold having a diameter of 7¼", which is the distance from *a* to *b* in the mold. *a* and *b* indicate the center points of opposite cross-sections of the mold cavity.

In using the term "rim diameter" with respect to the tire, it is to be understood that I mean the diameter of rim for which the tire is adapted.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. The method of making a single tube tire, including: winding a strip of fabric on a drum with a diameter materially greater than the rim diameter of the completed tire; joining the ends of said strip; joining the edges of said strip to form a tube; and inflating and curing said tube in a mold having an internal diameter substantially the same as the rim diameter of the completed tire.

2. The method as claimed in claim 1, in which the diameter of the drum is substantially 33⅓% greater than the rim diameter of the tire.

3. The method as claimed in claim 1, in which the diameter of the drum exceeds the rim diameter by a distance substantially equal to the cross-sectional diameter of the tire.

4. The method of making a single tube cord tire, including; cutting a strip of cord fabric with the cords lying at an angle of substantially 60° with respect to the line of cut; winding the strip of fabric on a drum with a diameter materially greater than the rim diameter of the tire; joining the ends of the strip; joining the edges of the strip to form a tube; and inflating and curing the tube in a mold having an inside diameter substantially the same as the rim diameter of the tire.

5. The method as claimed in claim 4, in which the diameter of the drum exceeds the rim diameter by substantially 33⅓%.

6. The method as claimed in claim 4, in which the diameter of the drum exceeds the rim diameter by a distance substantially equal to one-half of the cross-sectional diameter of the tire.

7. The method of making a single tube cord tire substantially 10" x 2¾", including; cutting a strip of cord fabric with the cords lying at an angle of substantially 60° with respect to the line of cut; winding the strip on a drum having a diameter of substantially 6"; joining the ends of the strip; joining the edges of the strip to form a tube; and inflating and curing said tube in a mold with dimensions substantially equal to the dimensions of the completed tire.

8. The method of making a single tube tire in which the sectional diameter exceeds 20% of the outside diameter, including; winding a strip of fabric on a drum with a diameter materially greater than the rim diameter of the completed tire; joining the ends of said strip; joining the edges of said strip to form a tube; and inflating and curing said tube in a mold having an internal diameter substantially the same as the rim diameter of the completed tires.

9. The method as claimed in claim 8, in which the diameter of the drum is substantially 33⅓% greater than the rim diameter of the tire.

10. The method as claimed in claim 8, in which the diameter of the drum exceeds the rim diameter by a distance substantially equal to one-half of the cross-sectional diameter of the tire.

11. The method of making a single tube tire in which the sectional diameter exceeds 20% of the outside diameter, including; cutting a strip of cord fabric with the cords lying at an angle of substantially 60° with respect to the line of cut; winding the strip of fabric on a drum with a diameter materially greater than the rim diameter of the tire; joining the ends of the strip; joining the edges of the strip to form a tube; and inflating and curing the tube in a mold having an inside diameter substantially the same as the rim diameter of the tire.

12. The method as claimed in claim 11, in which the diameter of the drum exceeds the rim diameter by substantially 33⅓%.

13. The method as claimed in claim 11, in which the diameter of the drum exceeds the rim diameter by a distance substantially equal to one-half of the cross-sectional diameter of the tire.

14. The method of making a single tube tire, including; forming a flattened tube on a drum with a diameter so that opposite centers of the flattened tube will be separated a distance substantially equal to the rim diameter plus the cross-sectional diameter of the tire; and inflating and curing said tube in a mold having dimensions substantially the same as the completed tire.

15. The method of building a tire which comprises forming a carcass embodying a cord fabric, and subjecting the carcass to inflation so controlled as to effect compensated contraction of its rim-engaging periphery and expansion of its tread portion to the desired size.

16. A single tube tire having a sectional diameter not less than 20% of its height diameter and having its rim-engaging periphery in compensated contraction and its tread portion in expansion.

17. A single tube cord tire having a sectional diameter not less than 20% of its height diameter and having its rim-engaging periphery in compensated contraction and its tread portion in expansion.

18. A single tube cord tire, having a strip of cord fabric with the cords therein lying at an angle of substantially 60° with respect to the line of cut, said tube having a sectional diameter not less than 20% of the height diameter and having its rim-engaging periphery in a compensated contraction and its tread portion in expansion.

ALVIN J. MUSSELMAN.